US 6,696,963 B2

(12) United States Patent
Zimmerman et al.

(10) Patent No.: US 6,696,963 B2
(45) Date of Patent: Feb. 24, 2004

(54) METHOD AND SYSTEM FOR ANTICIPATING SALT DEPLETION

(75) Inventors: Jeffrey A. Zimmerman, Forest Lake, MN (US); Gregory John Kennedy, Maplewood, MN (US); Jose A. Castro, Woodbury, MN (US); Wesley F. Chapman, Minneapolis, MN (US); John E. Ziegenfuss, Minneapolis, MN (US)

(73) Assignee: Ecowater Systems, Inc., Woodbury, MN (US)

( * ) Notice: Subject to any disclaimer, the term of this patent is extended or adjusted under 35 U.S.C. 154(b) by 42 days.

(21) Appl. No.: 10/052,112

(22) Filed: Jan. 17, 2002

(65) Prior Publication Data

US 2003/0132848 A1 Jul. 17, 2003

(51) Int. Cl.[7] ................................................ G08B 21/00
(52) U.S. Cl. ......................................... 340/612; 210/89
(58) Field of Search ................................ 340/612, 620, 340/623; 2310/89, 98, 140

(56) References Cited

U.S. PATENT DOCUMENTS

| | | | |
|---|---|---|---|
| 4,313,825 A | * | 2/1982 | Fleckenstein et al. ......... 210/89 |
| 4,385,357 A | * | 5/1983 | Davis et al. ................. 700/271 |
| 4,470,911 A | * | 9/1984 | Reinke ........................ 210/662 |
| 4,722,797 A | | 2/1988 | Gauer et al. |
| 5,132,669 A | * | 7/1992 | Jackson ....................... 340/612 |
| 5,232,953 A | * | 8/1993 | Johnson ....................... 521/26 |
| 5,239,285 A | * | 8/1993 | Rak ........................... 340/623 |
| 5,363,087 A | | 11/1994 | Johannsen et al. |
| 5,544,072 A | | 8/1996 | Zimmerman et al. |
| 5,774,529 A | | 6/1998 | Johannsen et al. |
| 6,284,132 B1 | | 9/2001 | Zimmerman et al. |
| 6,456,202 B2 | * | 9/2002 | Johannsen et al. .......... 340/623 |

* cited by examiner

Primary Examiner—John Tweel
(74) Attorney, Agent, or Firm—Piper Rudnick LLP

(57) ABSTRACT

The present invention provides a method and system of anticipating salt depletion in a brine tank of a water softener system, the system including a controller having a user interface and display, the method comprising the steps of tracking salt usage; determining the amount of salt remaining in the brine tank; calculating the number of days before salt is required in the brine tank based on salt usage and the amount of salt remaining in the brine tank; and providing an indication of the number of days to empty, whereby a user is able to anticipate the need to replenish the salt supply and plan accordingly to assure continuous satisfactory operation of the water softener system.

25 Claims, 5 Drawing Sheets

METHOD AND SYSTEM FOR ANTICIPATING SALT DEPLETION

FIELD OF THE INVENTION

The invention relates, generally, to water softeners and, more particularly, to a system and method for anticipating salt depletion.

BACKGROUND OF THE INVENTION

Domestic water softeners remove hardness from raw water by passing it through a tank containing a liquid treatment medium bed, typically formed of resin beads. A salt solution, that is brine, is passed through the resin bed to restore its softening capacity. The brine is formed in a container which is connected by a liquid flow passage to the tank containing the resin beads. The flow of liquid through the liquid flow passage is regulated by a control valve which is actuated by an electronic regeneration control circuit.

Salt, typically in the form of chunks or pellets, is placed in the container. Under the control of the electronic regeneration control circuit, the control valve allows a predetermined amount of water to enter the container. Provided enough salt is present, the water and salt form a saturated salt solution, or brine, which is the regenerant for the resin bed. Again, under the control of the electronic regeneration control circuit, the control valve is actuated to cause the brine to be withdrawn from the container and circulated through, and thereby regenerate, the resin in the tank.

The amount of salt remaining in the container is reduced each time a portion of the salt is dissolved to form a regenerant. The supply of salt will become exhausted after a number of regeneration cycles, unless additional salt is placed in the container. Such that the salt supply will not become exhausted, it is desirable to provide some type of alarm to indicate that the salt supply is close to being exhausted. Such an alarm may be formed as a part of the electronic regeneration control circuit.

U.S. Pat. No. 5,363,087 is assigned to the instant assignee and discloses an example of an apparatus which detects a low level of salt and generates a corresponding low salt level alarm and is incorporated herein by reference. U.S. Pat. No. 5,363,087 discloses an apparatus for providing a regeneration solution to a regenerable liquid treatment medium bed including an electronic regeneration control circuit for controlling the regeneration of a liquid treatment medium bed with regenerant solution formed in a container by dissolving a quantity of solid material in a liquid. The container in which the regenerant solution is formed is provided with indicia spaced apart in a vertical direction. The indicia are observable with respect to the top surface of the quantity of solid material received in the container. An electronic control circuit includes a manual input means for entering the amount of solid material available in the container in terms of the observed indicia most closely corresponding to the top surface of the solid material. The electronic control circuit includes means for electronically reducing, each time a quantity of regenerant solution is used to regenerate the liquid treatment medium, the electronically stored indication of the amount of solid material remaining in the container. The apparatus includes an alarm means which is actuated to provide an alarm when the electronically stored indication of the amount of solid material remaining in the container is less than a predetermined minimum amount.

U.S. Pat. No. 5,544,072, incorporated herein by reference, is assigned to the instant assignee and discloses a method for regeneration of a water softener including a method to determine when a regeneration should occur.

The prior art systems indicate or warn when a water softener unit is low or out of salt. A user must be ready to immediately replenish the salt supply, lest there be an interruption of service. A user must provide an overstock of salt in order to avoid such an interruption of service. An interruption of service maybe an inconvenience, but also carries a greater significance if the softener has been used to remediate any health effects such as the removal of barium or radium that may be in the water being treated.

SUMMARY OF THE INVENTION

It is an object of the present invention to provide a water softener with the ability to more accurately provide the status of the amount of remaining salt and avoid interrupted service.

It is a further object of the invention to provide a water softener which anticipates when salt should be added.

It is still a further object of the invention to provide a water softener which provides a user with an indication, in advance, when salt will be required.

Accordingly, the present invention provides a method of anticipating salt depletion in a brine tank of a water softener system, the system including a controller having a user interface and display, the method comprising the steps of (a) tracking salt usage; (b) determining the amount of salt remaining in the brine tank; (c) calculating the number of days before salt is required in the brine tank based on salt usage and the amount of salt remaining in the brine tank; and (d) providing an indication of the number of days to empty, whereby a user is able to anticipate the need to replenish the salt supply and plan accordingly to assure continuous satisfactory operation of the water softener system.

In one embodiment, the method of tracking salt usage includes tracking the average salt per regeneration, the average number of days between regeneration and the number of days since the last regeneration. The salt level value of step (a) is received via a user entering the value into the system via a user interface. The step of determining or recalculating the number of days before salt is required in the brine tank is based on the salt level value is done using the formula, A/B*C−D, wherein:

A=the salt level value;
B=the average salt per regeneration;
C=the average days between regenerations; and
D=the number of days since the last regeneration.

The present invention also provides a system for anticipating salt depletion in a brine tank of a water softener, the system having means for tracking salt usage; means for determining the amount of salt remaining in the brine tank; means for calculating the number of days before salt is required in the brine tank based on salt usage and the amount of salt remaining in the brine tank; and means for providing an indication of the number of days to empty, whereby a user is able to anticipate the need to replenish the salt supply and plan accordingly to assure continuous satisfactory operation of the water softener system. In one embodiment, the system includes means for recalculating the number of days before salt is required in the brine tank, in the event salt has been added to the brine tank, a regeneration has occurred, or another day has passed since the last regeneration.

DETAILED DESCRIPTION OF THE INVENTION

Figure 1:
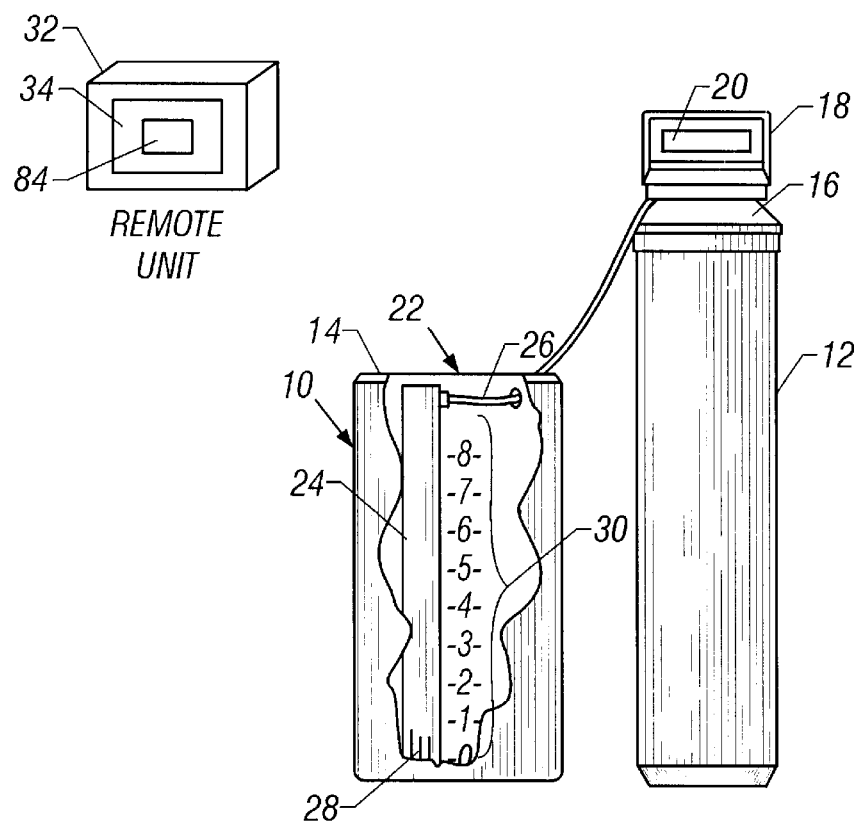
FIG. 1 is a perspective view of a water softener and system for monitoring the status of the water softener, in accordance with the present invention.

Referring to FIG. 1, this invention will be described as embodied in a water softener wherein the water softening system includes a salt container or tank 10 and a resin tank 12. The salt storage container is provided with a cover 14. The resin tank 12 is provided with a cover 16 which supports a housing 18 enclosing an electronic regeneration control circuit. The front face of the electronic control circuit housing 18 is provided with display and control panel 20. The cover 14 includes a removable lid 22 which is provided primarily for the purpose of permitting salt to be placed in the salt storage container. The salt storage container and the electronic control circuit are appropriately connected by a tube and electrical conductors to the resin tank and an electronically operated control valve respectively.

A brine well 24 is placed within the salt storage container 10. Placed within the brine well 24 is a conduit (not shown) which extends to near the bottom of the salt storage container 10. A tube 26 connects the conduit to the appropriate connection on the control valve. Openings 28 are provided at the bottom of the brine well 24 such that water may flow out of the brine well 24 and brine into the brine well 24. However, the opening 28 are sized such that solid particles, particularly salt, are prevented from entering the brine tank.

Under the control of the electronic control circuit, the control valve permits a predetermined amount of water to flow through the tube 26, conduit, and openings 28 in the brine well 24 into the brine tank. The flow of water into the brine well 24 may also be terminated by a float valve associated with the conduit and located in the brine well. As demanded by the electronic control circuit, the control valve is actuated to withdraw brine from the brine tank through the openings 28 in the brine well 24, the conduit and the tube 26 by a venturi pumping action.

In accordance with the embodiment of this invention shown in FIG. 1, indicia 30 are provided in association with the brine tank or container in such a manner as to be readily observable with respect to the top surface of the salt in the tank by removing the lid 22. As shown in FIG. 1, the indicia 30 are integrally formed on the inside surface of the container 10. However, the indicia 30 could be formed on the sidewall of the resin tank 12, if the tank 12 were located within the salt storage container 10, in such a position for the indicia 30 to be readily visible when the lid 22 is removed. The indicia 30 could, of course, be provided on the sidewall of the salt tank 10 in other ways, such as by providing a separately formed measurement strip similar to a ruler or yardstick, having the indicia 30 formed thereon, which strip being secured to the sidewall of the salt tank 10. While the indicia 30 may be provided in many different ways, they should, of course, be provided in a form which is not attacked by the corrosive atmosphere resulting from the brine contained within the tank. In the preferred embodiment of this invention, the indicia 30 are spaced apart in a vertical direction such that the space between adjacent indicia 1 through 9 represents one-tenth of the total salt capacity of the tank.

The water softener may include a remote unit 32 having a display panel 34. The status information of the present invention, as described in detail below, may be provided to a remote location via the remote user. U.S. Pat. No. 5,774,529 discloses an example of such remote operation, and is incorporated herein by reference.

Figure 2:
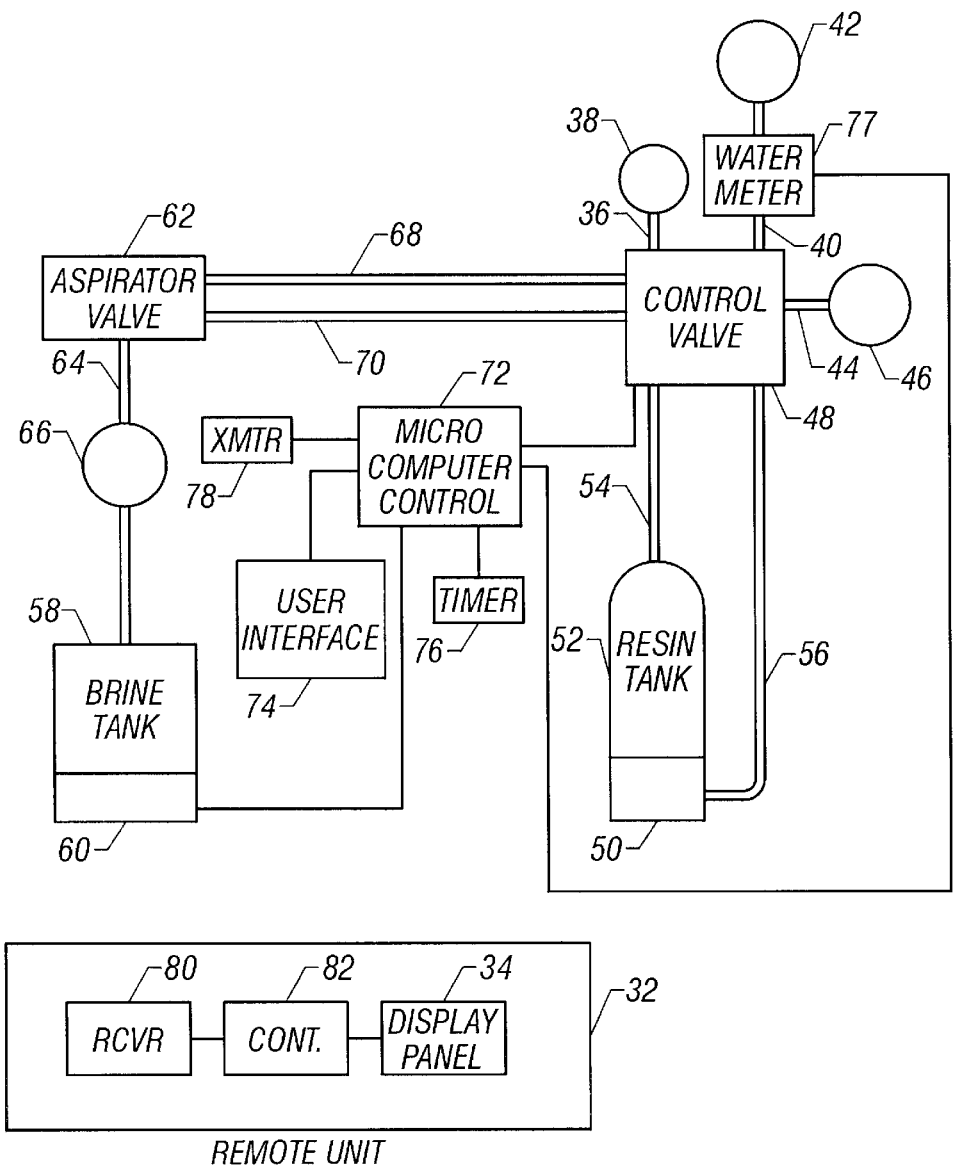
FIG. 2 is a block diagram of the water softener and system of FIG. 1.

With reference to FIG. 2, water softener preferably includes a source pipe 36, connected to a source 38 of hard water, a destination pipe 40, connected to a destination 42 intended to use the softened water, and a drain pipe 44 connected to a drain 46. Pipes 36, 40, 44 are also connected to a control valve 48. A resin bed 50, preferably comprising particles of ion exchange resin, is disposed in a resin tank 52. A pipe 54 and a pipe 56 connect resin tank 52 to control valve 48. A brine tank 58 holds a quantity of a regenerant salt 60, typically NaCl or KCl, and is connected to an aspirator valve 62 by a pipe 64. Pipe 64 includes a brine valve 66. Alternatively, and preferably, the brine valve is located in the brine tank 60. Pipes 68, 70 connect aspirator valve 62 to control valve 48. Control valve 48 may be configured to interconnect pipes 36, 40, 44, 54, 56, 68, 70 in a number of different ways hereinafter described.

The water softener preferably includes a micro computer controller 72 and a user interface 74 having the display and control panel 20. A timer 76 is provided to enable controller 72 to measure time durations. A water meter 77 is placed in either pipe 36, or preferably pipe 40, to enable controller 72 to measure the amount of water flowing through resin tank 52. Controller 72 sets the configuration of control valve 48.

When in service, hard water from source 38 passes through supply pipe 36 to control valve 48, which is configured so that the hard water then flows through pipe 54 to resin tank 52. In resin tank 52 the hard water passes through resin bed 50, where it is softened by an ion exchange process. The soft water flows out from resin tank 52 through pipe 56 to control valve 48. Control valve 48 is configured to direct the soft water from pipe 56 to pipe 40, where it is directed to its destination 42.

When the resin bed 50 loses its capacity to effectively soften the water passing through it, regeneration is necessary. The regeneration cycle preferably includes the following steps: (1) fill; (2) brine draw; (3) slow rinse; (4) backwash; and (5) fast rinse. During the fill step, a quantity of water flows into brine tank 58 to dissolve a quantity of the salt therein in order to make the amount of brine necessary for regeneration. Specifically, control valve 48 is configured so that hard water from source 38 flows through pipe 36 to pipe 54 to resin tank 52. The hard water passes through resin bed 50 and flows out through pipe 56 to control valve 48. Control valve 48 is configured to direct this water to pipe 68 and then to pipe 64 through aspirator valve 62. Brine valve 66 opens in response to the flow of water in pipe 64, allowing the water to enter brine tank 58. The water filling brine tank 58 dissolves a quantity of the salt to form a brine. The duration of the fill step determines the amount of water that enters brine tank 58 and therefore the amount of regenerant salt dissolved and available for regeneration.

During the brine draw step, control valve 48 is configured so that hard water from pipe 36 is directed to pipe 68, whereupon it flows through aspirator valve 62 to pipe 70. This flow through aspirator valve 62 creates suction on pipe 64 by the Venturi effect. Brine valve 66 is open, so that the suction on pipe 66 draws the brine in brine tank 58 formed during the fill step, up into pipe 64, which then flows through aspirator valve 62 to pipe 70. Control valve 48 is configured so that the water and brine from pipe 70 are directed through pipe 54 to resin tank 52. The brine entering resin tank 52 flows through resin bed 50, thereby regenerating it, and flows out through pipe 56 as waste. Alternatively, and preferably, the flow of brine is to pipe 56, then through resin tank 52, and out pipe 54. The waste is directed to drain 46 via pipe 44 for its disposal. The duration of the brine draw step is sufficiently long so as to withdraw all or nearly all of the brine from brine tank 58. Preferably, a brine valve in brine tank 58 closes automatically when the level of brine in brine tank 58 falls below a prescribed point.

During the slow rinse step, the brine valve is closed, and brine is no longer withdrawn from brine tank 58. However, water keeps flowing as in the brine draw step. In particular, the configuration of control valve 48 is the same as for the brine draw step. The remaining brine continues to flow through resin bed 50 until replaced with incoming water in order to achieve maximum ion exchange and to continue to flush out any hardness minerals or brine which may remain in resin tank 52.

During the backwash and fast rinse steps, control valve 48 is configured so that hard water from pipe 36 is directed so that the water flows through the resin bed 50 and is directed to drain 46 via pipe 44. During the backwash step, the water flows up through resin bed 50, lifting up and expanding the resin bed and flushing out iron minerals, dirt, sediments, hardness minerals, and any remaining brine. During the fast rinse step, a fast flow of water is directed downward through resin bed 50 to pack it and prepare it for service.

Controller 72 determines when to regenerate resin bed 50 and to what capacity. Various methods may be used for these determinations, such as those described in U.S. Pat. Nos. 5,544,072 and 4,722,797. The necessary capacity will, in general, depend on the hardness of the water to be treated. User interface 74 therefore preferably includes means by which the user can enter the water hardness, expressed in grains per gallon, into controller 72. To accommodate the use of different types of regenerant salt, user interface 74 also enables the user to specify the type of salt used, e.g., whether NaCl or KCl is used.

The water softener also includes a transmitter 78 for transmitting status information to the remote unit 32. The remote unit includes a receiver 80 coupled to a remote controller 82 which in turn is coupled to the display panel 34.

Figure 3:
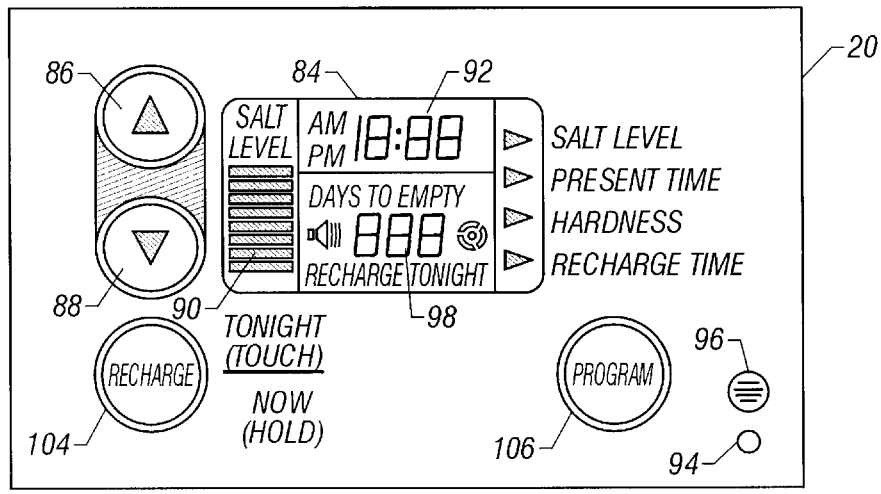
FIG. 3 is a perspective of the display panel of the water softener of FIG. 1.
Figure 4:
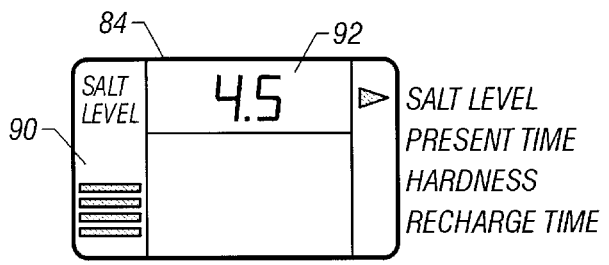
FIG. 4 is a partial view of the display panel with the salt level option selected.

Provided on the display and control panel 20 of the softener system are manual input means for inputting salt levels as observed with respect to the indicia 30 and a user display 84. Referring to FIGS. 1, 3 and 4, the control manual input means includes a salt increase key 86, a salt decrease key 88, a salt level display, shown as a bar indicator 90 and a numerical display 92, an alarm indicator, such as an LED indicator 94 or an audio buzzer 96, and a days to empty indicator 98. The display panel 34 of the remote unit 32 also provides a user display 84.

Figure 5:
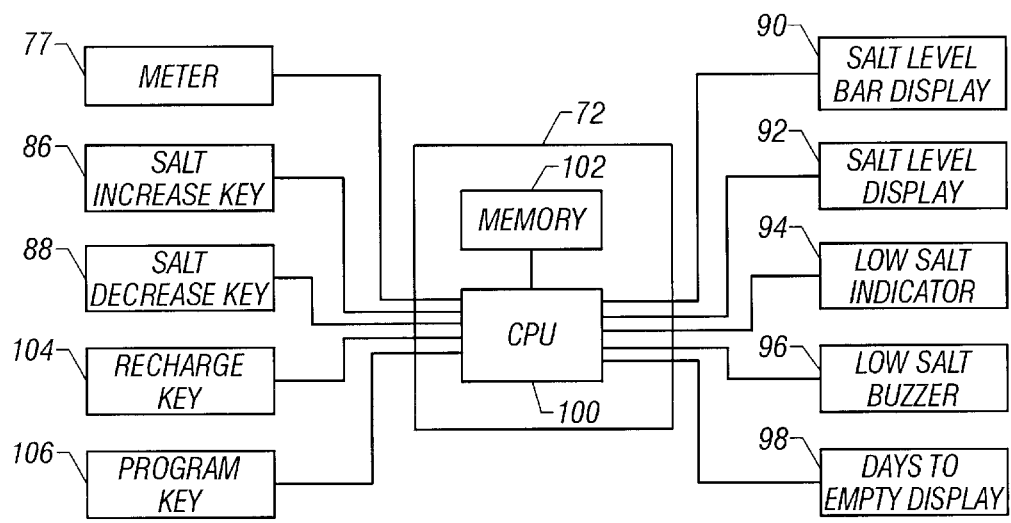
FIG. 5 is a block diagram of a portion of a control circuit in accordance with a preferred embodiment of this invention.

Referring to FIG. 5, the controller 72 is shown to include a CPU 100 and a memory 102. The user interface 74 includes the control and display panel 20. FIG. 5 shows the connections of the control and display panel 20 to the controller 72. Inputs to the central processing unit 100 include the salt increase key 86, the salt decrease key 88, the meter 77, a recharge key 104 and a program key 106. Outputs of the controller 72 include the salt level display bar 90, the salt level display 92, the low salt indicator 94, the low salt buzzer 96 and the days to empty display 98. The operation of the circuit shown in FIG. 5 is in accordance with the flow charts of FIGS. 6 and 7. It should be understood that only those aspects of the electronic regeneration control circuit directly relating to this invention are shown in FIG. 5. The microcomputer also has other inputs, such as time of day, usage of processed water, etc. and also additional outputs such as those controlling the control valve.

With reference to FIG. 3, the program button 106 is used to navigate through the options and information available to the user. The selected item can then be changed with the UP/DOWN buttons. For example, from a default display, the program button 106 may be used to access the primary level options which include the Set Salt Level, Set Present Time, Set Hardness and Set Recharge Time. If the salt level option is selected such as shown in FIG. 4, the UP/DOWN buttons function as the salt increase key 86 and the salt decrease key 88, respectively. As the salt level is adjusted by the user, the salt level bar display 90 and the salt level numerical display 92 change accordingly.

In one embodiment, inside the brine tank, nine levels (0–8) are indicated via the indicia 30. Each level corresponds to one bar on the Salt Level bar display 90. The user adjusts the salt level bar to match the indication inside the brine tank 10 after adding salt. Press and release the UP or DOWN button to have the number displayed increase or decrease by 0.5. The salt bars are incremented or decremented on whole numbers. Holding the UP or DOWN button causes the bars to increase or decrease at a rate of 1 bar every second. After adjusting the Salt Level Bars, the controller 72 assumes the salt is at the level indicated (in ½ increments) inside the container 10.

The recharge button 104 has two different functions. The first function schedules a regeneration to occur at the next recharge time. The second function causes a regeneration to begin immediately.

The DAYS TO EMPTY information is displayed when the controller 72 is in the default display. The purpose of this feature is to inform the owner, the number of days before the Salt Level in the brine tank or container 10 reaches level 0. The level is updated daily at a set time, such as at midnight, and whenever the Salt Level value is modified.

The formula used to calculate the DAYS TO EMPTY (DTE) is shown in the following table.

TABLE 1

Figure 6:
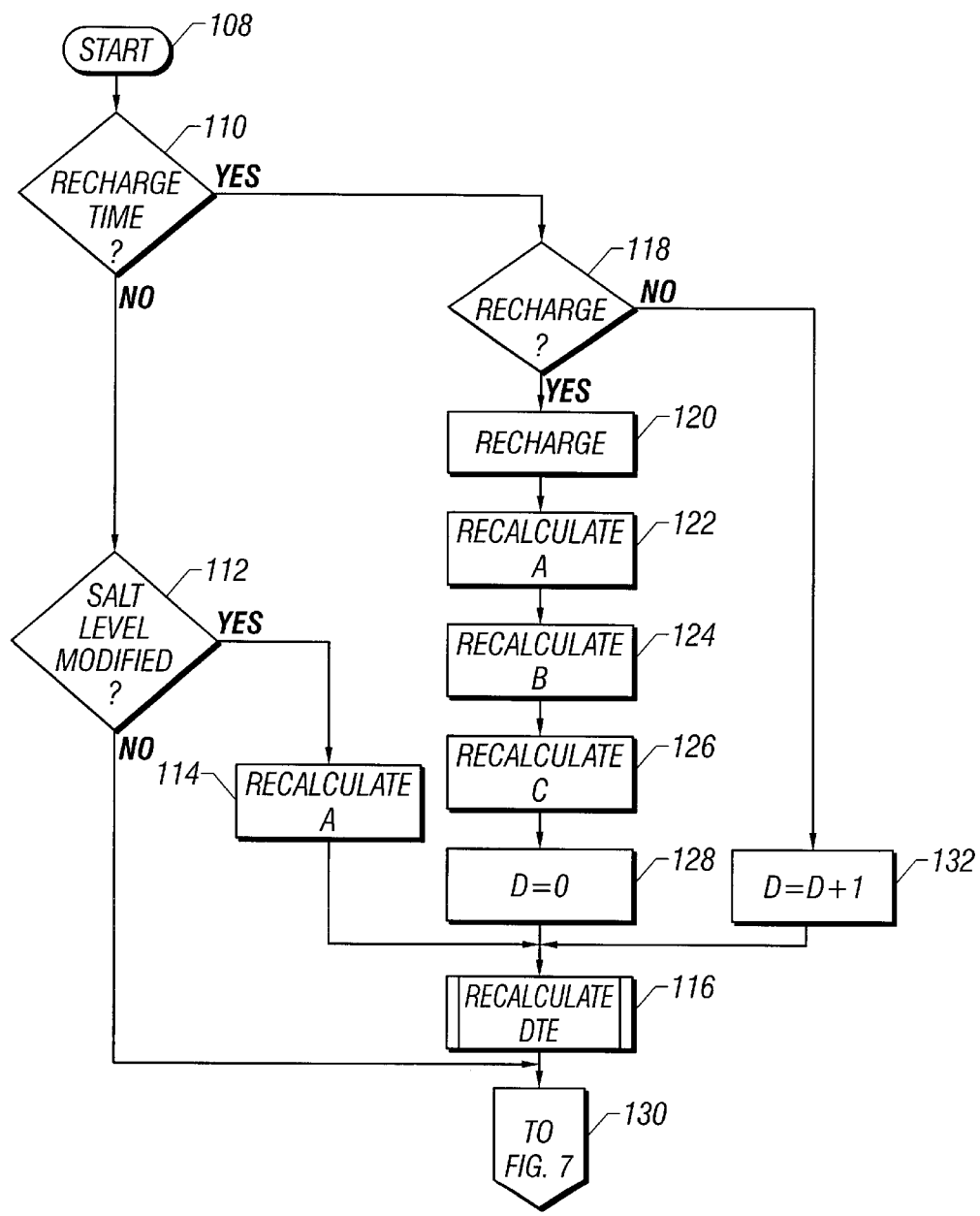
FIG. 6 is a flowchart of the days to empty feature of the present invention.

DTE = (A/B) × C − D
Wherein,
A = total salt remaining in the brine tank
B = the average salt used per regeneration based on 70% of the old average and 30% of the salt used in the last regeneration
C = the average days between regenerations based on 70% of the old average and 30% of the number of days between the last two regenerations
D = the number of days since the last regeneration FIG. 6 discloses one embodiment for the DAYS TO EMPTY feature of the present invention. After the start step 108, there is a decision branch 110 to determine whether it is the pre-programmed recharge time (i.e., midnight). In the event it is not the recharge time, the program continues to the Salt Level modified Decision Branch 112. At the Salt Level Modified Decision Branch 112, it is determined whether the Salt Level has been modified, such as by the user input. In the event the Salt Level has not been modified, the program continues with the flowchart shown at FIG. 7 and eventually returns to the start 108 of the flowchart of FIG. 6. In the event the Salt Level has been modified, the program continues with the recalculate A step 114. At the recalculate A step 114, the total salt remaining is recalculated based on the modified Salt Level. The program then continues with the recalculate DTE step 116. The recalculate DTE step 116 recalculates the number of days to empty, taking into consideration the modified total salt remaining.

In the event it is determined that it is the recharge time at the recharge time Decision Branch 110, the program continues with the recharge Decision Branch 118. The process for deciding whether it is time for a recharge is known in the prior art. In the event it is determined that it is time for a recharge, the program continues with the recharge step 120. After the recharge has been conducted, the program continues with the recalculate A step 122, wherein the total salt remaining is recalculated based on the salt used during the recharge. The program then continues with the recalculate B step 124, wherein the average salt per regeneration is recalculated based on the salt used in the last regeneration. The program then continues with the recalculate C step 126, wherein the average days between regenerations is recalculated based on the number of days between the last two regenerations. The program then continues with the D=0 step 128, wherein the number of days since the last regeneration is reset to 0. The program then continues with the recalculate DTE step 116, wherein the days to empty is recalculated based on the foregoing adjustments. The program then branches at step 130 to the flow chart of FIG. 7.

In the event it is determined at the recharge Decision Branch 118 that it is not time for a recharge, the program continues with the D=D+1 step 132. The D=D+1 step 132 increments the number of days since the last regeneration. The program then continues with the recalculate DTE 116, wherein the days to empty is recalculated based on an additional day elapsing without a regeneration having occurred.

Figure 7:
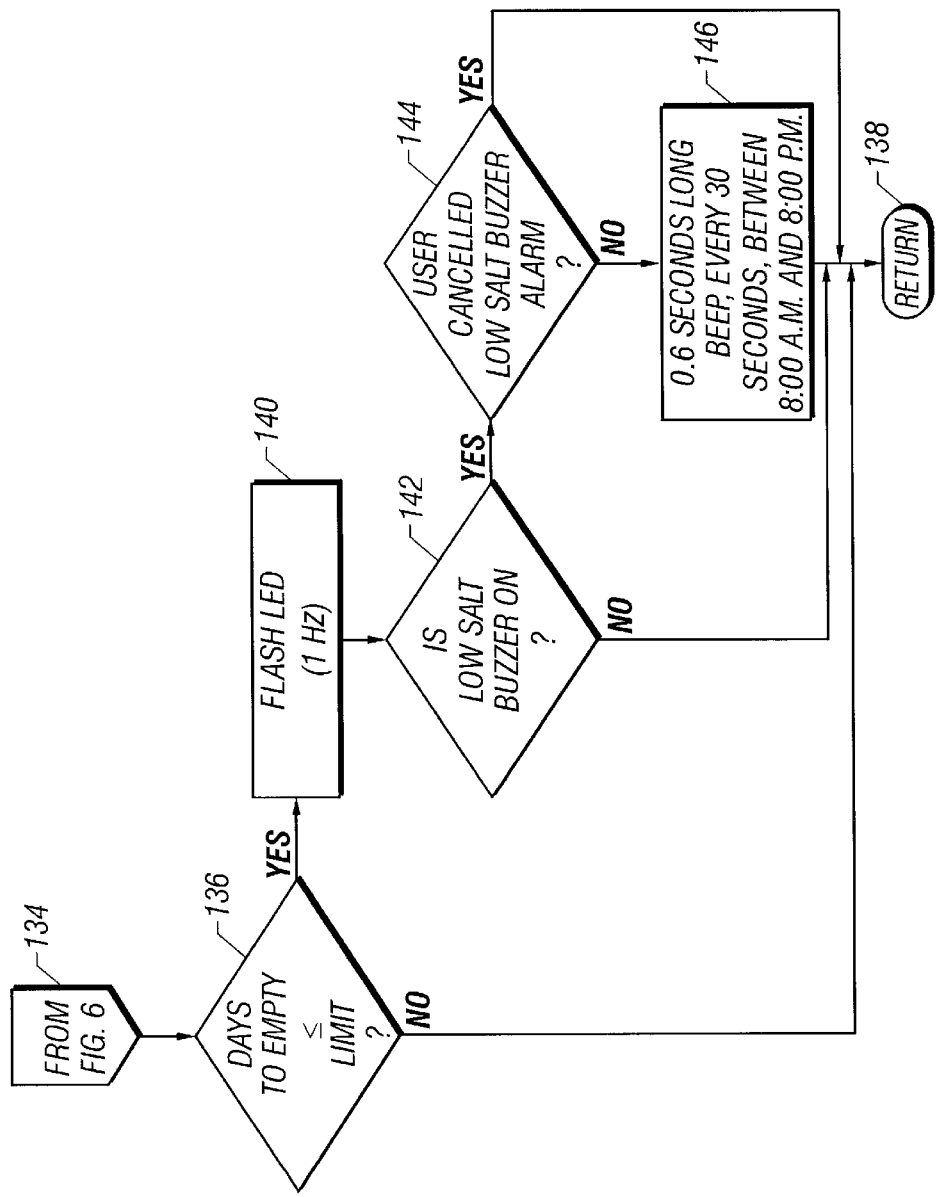
FIG. 7 is a flowchart of the alarm indication feature of the present invention.

FIG. 7 discloses the program for indicating when a days to empty limit has been reached. When the limit has been reached, a visual and audio indication may be provided as described in the following example. The example assumes a DTE limit of 15 days. However, it will be appreciated that the limit could be greater or less than 15 days. In the example, when the DAYS TO EMPTY value is 15 or less the Low Salt LED 94 will flash at a rate of 1 flash every second. If at this time, the Low Salt Buzzer option is on, the buzzer 96 will alert the user of the condition by emitting one 600-millisecond beep every 30 seconds between 8 am. and 8 pm. After the user presses any key, the Low Salt LED 94 will continue to flash (once per second), and the beeping sequence is discontinued. A screen showing the user that the buzzer 96 has been turned off will be displayed while the key is being pressed. The Low Salt LED 94 will continue flashing and the buzzer 96 will remain quiet until the user sets the Salt Level to a value that will predict a days to empty value greater than 15. At this point, the Low Salt LED 94 will go back to its normal on (solid) condition and the buzzer 96 will be ready to sound again when the DAYS TO EMPTY value is 15 or less.

The program begins with step 134 which is a branch from step 130 of FIG. 6. The program continues with the Decision Branch 136 to determine whether the days to empty limit has been reached. In the event the limit has not been reached, the program continues on to the return step 138. If the limit has been reached, the program continues with the flash LED step 140. Thereafter, the program continues with the Decision Branch 142 to determine whether the Low Salt Buzzer is on. In the event the buzzer is not on, the program continues to the return step 138. If the buzzer is set, the program continues with the Decision Branch 144 to determine whether the user has cancelled the Low Salt Buzzer Alarm. In the event the user has cancelled the alarm, the program continues with the return step 138. In the event the use has not cancelled the alarm, the program continues with the buzzer step 146. At the buzzer step 146, the program activates the buzzer 0.6 seconds, every 30 seconds between 8 am. and 8 pm., or as otherwise programmed, or until the user presses a key, such as the program key 106, to acknowledge the buzzer indication.

While preferred embodiments of the present invention have been illustrated and described, it will be understood by those of ordinary skill in the art that changes and modifications can be made without departing from the invention in its broader aspects. Various features of the present invention are set forth in the following claims.

What is claimed:

1. A method of anticipating salt depletion in a brine tank of a water softener system, the system including a controller having a user interface and display, the method comprising the steps of:

(a) tracking salt usage;

(b) determining the amount of salt remaining in the brine tank;

(c) calculating the number of days before salt is required in the brine tank based on salt usage and the amount of salt remaining in the brine tank; and (d) providing an indication of the number of days to empty, whereby a user is able to anticipate the need to replenish the salt supply and plan accordingly to assure continuous satisfactory operation of the water softener system.

2. The method of claim 1, wherein salt usage is tracked via monitoring the water demand of the water softener system and elapsed time.

3. The method of claim 1, wherein the method of tracking salt usage includes tracking the average salt per regeneration, the average number of days between regeneration and the number of days since the last regeneration.

4. The method of claim 3, wherein the average salt per regeneration is based on 70% of a previous average and 30% of the salt used during the last regeneration, and the average number of days between regenerations is based on 70% of a prior average and 30% of the number of days between the last two regenerations.

5. The method of claim 1, further comprising the step of repeating steps (a) through (d).

6. The method of claim 1, further comprising the step of recalculating the number of days before salt is required in the brine tank, in the event salt has been added to the brine tank, a regeneration has occurred, or another day has passed since the last regeneration.

7. A method of anticipating salt depletion in a brine tank of a water softener system, the system including a controller having a user interface and display, the method comprising the steps of:

(a) receiving a salt level value via the user interface;

(b) determining the number of days before salt is required in the brine tank based on the salt level value;

(c) recalculating the number of days, in the event the salt level in the brine tank has been modified by the user, as indicated by a salt level value received from a user via the user interface;

(d) recalculating the number of days, upon reaching a defined recharge time, but only if it is determined that a regeneration cycle is not required at the defined recharge time;

(e) recalculating the number of days after a regeneration cycle has occurred, the recalculation based on the amount of salt used during the regeneration cycle; and (f) providing an indication of the current number of days to empty, whereby a user is able to anticipate the need to replenish the salt supply and plan accordingly to assure continuous satisfactory operation of the water softener system.

8. The method of claim 7, wherein the defined recharge time occurs daily and step (d) includes subtracting one day from the number of days upon reaching the defined recharge time, but only if it is determined that a regeneration cycle is not required at the defined daily recharge time.

9. The method of claim 7, wherein in step (e) the amount of salt used during the regeneration cycle is calculated based on the average salt used per regeneration cycle.

10. The method of claim 9, wherein the average salt per regeneration cycle is based on 70% of a running average of salt-per regeneration cycle and 30% of the salt used in the last regeneration cycle.

11. The method of claim 10, wherein the amount of salt used during a regeneration cycle is based on the amount of water introduced in the brine tank during the regeneration cycle.

12. The method of claim 7, further comprising the steps of tracking water usage, and initiating a regeneration cycle based on the water usage.

13. The method of claim 7, further comprising the step of maintaining the number of days since the last regeneration cycle.

14. The method of claim 13, wherein determining or recalculating the number of days before salt is required in the brine tank based on the salt level value is done using the formula, A/B*C−D, wherein:

A=the salt level value;
B=the average salt per regeneration;
C=the average days between regenerations; and
D=the number of days since the last regeneration.

15. The method of claim 14, wherein the average salt per regenerations (B) is based on 70% of a previous average salt per regeneration and 30% of the salt for the last regeneration.

16. The method of claim 15, further comprising the step of determining salt usage during a regeneration based on the water used to create a brine solution for a regeneration cycle.

17. The method of claim 14, wherein the average days between regenerations (C) is based on 70% of a previous average days and 30% of the days between the last two regenerations.

18. The method of claim 7, wherein the salt level value of step (a) is received via a user entering the value into the system via the user interface.

19. The method of claim 7, wherein step (b), determining the number of days before salt is required in the brine tank, is based on the salt level value, the history of the salt usage, and the average days between regenerations.

20. The method of claim 7, further comprising the step of displaying the number of days via the user interface.

21. The method of claim 7, further comprising the step of displaying the number of days via the user interface, upon request by a user.

22. The method of claim 7, further comprising the step of repeating steps (c) through (f).

23. A system for anticipating salt depletion in a brine tank of a water softener, the system comprising:

means for tracking salt usage;

means for determining the amount of salt remaining in the brine tank;

means for calculating the number of days before salt is required in the brine tank based on salt usage and the amount of salt remaining in the brine tank; and means for providing an indication of the number of days to empty, whereby a user is able to anticipate the need to replenish the salt supply and plan accordingly to assure continuous satisfactory operation of the water softener system.

24. The system of claim 23, further comprising means for recalculating the number of days before salt is required in the brine tank, in the event salt has been added to the brine tank, a regeneration has occurred, or another day has passed since the last regeneration.

25. The system of claim 23, further comprising means for providing a remote indication of the number of days to empty.

* * * * *